H. S. HOYT.
NUT OR BOLT HOLDER.
APPLICATION FILED SEPT. 5, 1917.
1,257,003.
Patented Feb. 19, 1918.
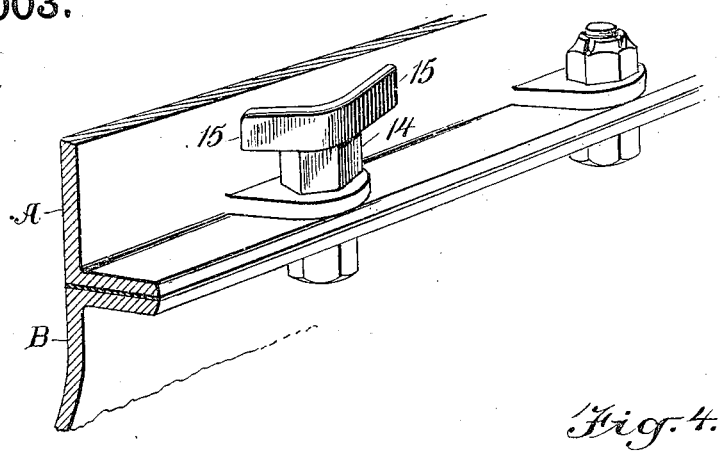
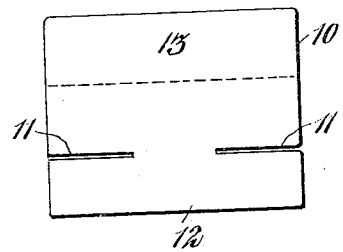
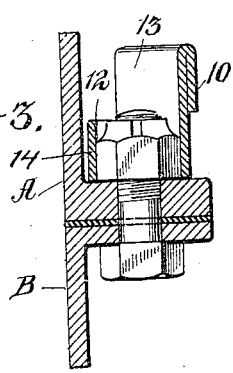
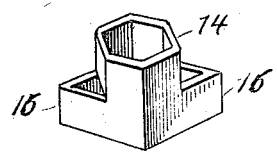
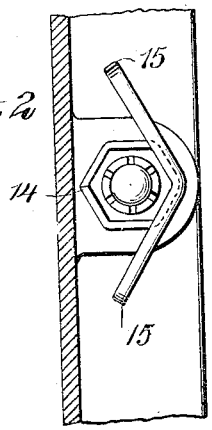
INVENTOR
Howard S. Hoyt
BY
C. W. Fairbank
ATTORNEY

UNITED STATES PATENT OFFICE.

HOWARD S. HOYT, OF BETHEL, CONNECTICUT, ASSIGNOR TO MOTOR SPECIALTIES COMPANY, OF WALTHAM, MASSACHUSETTS, A CORPORATION OF MASSACHUSETTS.

NUT OR BOLT HOLDER.

1,257,003.  Specification of Letters Patent.  Patented Feb. 19, 1918.

Application filed September 5, 1917. Serial No. 189,721.

*To all whom it may concern:*

Be it known that I, HOWARD S. HOYT, a citizen of the United States, and resident of Bethel, in the county of Fairfield and State of Connecticut, have invented certain new and useful Improvements in Nut or Bolt Holders, of which the following is a specification.

This invention is an article designed to be slipped over the head of a bolt or over a nut to prevent it from turning while the coöperating nut or bolt is being rotated by a wrench or other suitable tool in screwing the nut on or off. It is designed for use where one of the parts held by the bolt and nut has some projecting part with which my improved holder may engage and be held against rotation, and it is particularly useful where the bolted structure is of such a character that one person cannot gain access to or conveniently hold the bolt or the nut and at the same time turn the other.

Merely as an example of a bolted structure in connection with which my device is especially useful is the crank case and transmission gear case of some makes of automobiles, as, for instance, the Ford, where two men are ordinarily required in bolting or unbolting the parts, one to hold the nut or bolt from turning while the other is turned by the other man. Of course I do not desire to be limited to this particular use. With some bolted structures I may leave the device on the nut all of the time and let it serve as a nut lock.

The main object of my invention is to produce a very simple and inexpensive article which may be stamped from sheet metal; which will properly engage with the bolt-head or nut to be held against rotation in respect thereto; which will properly engage the adjacent part of one of the bolted structures irrrespective of slight variations in the distance from said part to the bolt-holder; which cannot be accidentally displaced or worked loose when in use; which resists turning strain quickly and equally in both directions; and which resists such strains in the direction of the length rather than transversely of the part which engages the bolted structure, thereby permitting of the use of light weight material.

In its preferred construction, it is made from a sheet metal blank slitted to form two contiguous strips integral and in the same plane along their central portions. The ends of one strip are bent around and secured together to form a collar or socket part with the nut or bolt-head receiving opening of such polygonal or non-circular cross section as will adapt it to loosely fit the part received but be held against rotation in respect thereto. The ends of the other strip constitute wings which are each substantially tangent to said collar and are preferably in the planes of adjacent sides of said collar if the latter be polygonal so that they incline in opposite directions and their ends may engage with the clamped part upon a slight rotation in either direction of the device and the bolt or nut held therein.

In the accompanying drawings, I have illustrated certain embodiments of my invention although it will be evident that changes may be made within the scope of the appended claims without departing from the spirit of my invention. In these drawings:

Figure 1 is a transverse section through a part of a bolted structure with my improved device in use thereon;

Fig. 2 is a top plan view;

Fig. 3 is a vertical section of the device;

Fig. 4 is a plan view of a blank from which the device may be formed; and

Fig. 5 is a perspective view of a modified form.

The form shown in Figs. 1, 2 and 3 is made from a blank of substantially the form shown in Fig. 4. This blank 10 has slits 11 extending inwardly from opposite sides to form two strip portions 12 and 13. One of these is shown as being of approximately twice the width of the other. The two strip portions are integral along their central portions. The end portions of the strip 12 are bent around and brought together so as to form a band 14 constituting a collar or socket to receive the nut or bolt head. The shape of this collar will of course vary with the shape of the nut or bolt head in connection with which the device is to be used. As shown, it is hexagonal to fit a hexagonal nut or bolt-head and the strip portion 12 is of a width substantially equal to the thickness of the nut or bolt-head.

The strip portion 13 is bent back upon itself along a line longitudinally thereof and indicated in dotted lines in Fig. 4 to make the strip of double thickness. The central unslitted portion of the blank between the strips 12 and 13 is of approximately one-third the length of the strip 12 so that in bending the strip 12 to form the collar, the strip 13 will likewise be bent to follow two sides of the hexagon of the collar. The free ends of the strip 12 will therefore lie at approximately 120° to each other and will be approximately tangential to the circle of the collar 14. The end portions of the strip 13 thus constitute wings or projections 15 of double thickness inclined in the same general direction, that is, toward the same vertical surface at one side of the axis of the bolt.

In applying the device, the collar 14 is merely slipped over the bolt-head or nut and the wings 15 will come adjacent to or in engagement with a part of one of a pair of bolted members. With the device in use as shown in Fig. 1 and upon the bolt-head, a person may rotate the nut in loosening or tightening the same without rotation of the bolt. Any tendency of the bolt to turn in either direction will bring the end of one of the wings against the surface of one of the bolted members and lock the bolt against rotation. It is quite important to note that this strain comes in the general direction of the length of a wing so that these wings may be of comparatively light material. For ordinary purposes, it may not be necessary to make them of double thickness as shown in the drawing.

I have shown the strip 13 folded over outwardly but it will be evident that it may be folded the other way equally as well, or if sufficiently thick material be used no folding over is necessary. In Fig. 5 I have shown a slightly modified form in which the same collar and wings are employed but the wings, instead of being of double thickness, are duplicated. Thus the two pair of wings form a diamond-shaped figure 16 for the hexagonal collar 13. If all of the wing parts are formed of a single strip they may be integral with the collar at one side and brazed or otherwise secured to it at the opposite side. This device thus resists not only by a compression in the direction of the length of certain of the essential parts but a tension in the direction of the lengths of the others.

Having thus described my invention, what I claim as new and desire to secure by Letters Patent is:

1. A nut or bolt holder formed of two sheet metal strips integral along their central parts, one of said strips having its ends secured together to form an annular collar or socket open at one end to receive a nut or bolt-head and the other strip having its ends forming projections to prevent rotation of said holder.

2. A nut or bolt holder formed of a sheet metal band adapted to slip endwise on to a nut or bolt head and provided with a projection at one edge in the general direction of the axis and a wing carried by said projection substantially tangential to said band.

3. A nut or bolt holder including a sheet metal band open at one end to receive a nut or bolt head inserted in an axial direction and having a projection at one edge in the general direction of the axis and a pair of wings extending in opposite directions from said projection and at an angle to each other and substantially tangential to said band.

4. A nut or bolt holder including an annular sheet metal band for receiving a nut or bolt head and having a projection at one edge in the general direction of the axis and a pair of wings extending in opposite directions from said projection and substantially tangential to said band for engagement with a stationary part upon the rotation of said band and the nut or bolt head in one or the other direction.

5. A nut or bolt holder including a sheet metal band having a projection at one edge in the general direction of the axis and a pair of wings of double thickness extending in opposite directions from said projection and substantially tangential to said band.

6. A nut or bolt holder including an annular sheet metal band and a pair of wings integral therewith and substantially tangential thereto.

7. A nut or bolt holder including a sheet metal band and a pair of wings integral therewith and substantially tangential thereto and offset in an axial direction.

8. A nut or bolt holder including a collar and a pair of wings rigid therewith and substantially tangential thereto and offset in an axial direction.

Signed at Bethel, in the county of Fairfield and State of Connecticut, this 31st day of Aug., A. D. 1917.

HOWARD S. HOYT.